(12) United States Patent
Anupongongarch et al.

(10) Patent No.: US 9,618,783 B2
(45) Date of Patent: Apr. 11, 2017

(54) RESISTOR MESHES FOR DISPLAY HEATING

(71) Applicant: Kopin Corporation, Westborough, MA (US)

(72) Inventors: Chompoonoot Anupongongarch, Shrewsbury, MA (US); Frederick P. Herrmann, Sharon, MA (US); Wen-Foo Chern, Wayland, MA (US)

(73) Assignee: Kopin Corporation, Westborough, MA (US)

( * ) Notice: Subject to any disclaimer, the term of this patent is extended or adjusted under 35 U.S.C. 154(b) by 94 days.

(21) Appl. No.: 14/080,497

(22) Filed: Nov. 14, 2013

(65) Prior Publication Data
US 2014/0152933 A1  Jun. 5, 2014

Related U.S. Application Data

(60) Provisional application No. 61/732,277, filed on Nov. 30, 2012.

(51) Int. Cl.
| | | |
|---|---|---|
| *G09G 3/36* | (2006.01) | |
| *G02F 1/1333* | (2006.01) | |
| *G02F 1/1362* | (2006.01) | |

(52) U.S. Cl.
CPC .. *G02F 1/133382* (2013.01); *G02F 1/136213* (2013.01); *G02F 1/136286* (2013.01);
(Continued)

(58) Field of Classification Search
CPC ......... G02F 1/133382; G02F 1/136213; G02F 1/136286; G09G 3/36; G09G 3/3648; G09G 3/3655; G09G 2320/041; G09G 2300/0426
(Continued)

(56) References Cited

U.S. PATENT DOCUMENTS

| | | |
|---|---|---|
| 5,063,378 A | 11/1991 | Roach |
| 5,559,614 A | 9/1996 | Urbish et al. |

(Continued)

FOREIGN PATENT DOCUMENTS

| | | |
|---|---|---|
| EP | 0084873 | 8/1983 |
| TW | 221071 | 2/1994 |

(Continued)

OTHER PUBLICATIONS

The International Search Report and the Written Opinion of the International searching Authority mailed on Mar. 18, 2014 for International Application No. PCT/US2013/070139, filed Nov. 14, 2013, entitled "Resistor Meshes for Display Heating".

(Continued)

*Primary Examiner* — Amr Awad
*Assistant Examiner* — Aaron Midkiff
(74) *Attorney, Agent, or Firm* — Hamilton, Brook, Smith & Reynolds, P.C.

(57) ABSTRACT

An improved Liquid Crystal Display (LCD) heating system is provided. Resistor meshes, in particular VCOM resistor heating meshes, in the pixel array improve capacity of the display heater (heating system) so that the display is heated faster from low temperatures. The resistor mesh design provides much lower resistance from one point in the pixel array to an edge than pixel-to-pixel horizontal VCOM resistance, thus reducing horizontal crosstalk. Further, the approach permits the display to be active during the warm-up process.

16 Claims, 16 Drawing Sheets

(52) U.S. Cl.
CPC ..... *G02F 2202/104* (2013.01); *G09G 3/3648* (2013.01); *G09G 2300/0426* (2013.01)

(58) Field of Classification Search
USPC .............................................. 345/87; 349/21
See application file for complete search history.

(56) References Cited

U.S. PATENT DOCUMENTS

| | | | |
|---|---|---|---|
| 5,694,147 A * | 12/1997 | Gaalema ........... | G02F 1/133382 345/101 |
| 5,694,191 A | 12/1997 | Strathman et al. | |
| 5,999,242 A * | 12/1999 | Walton et al. ................ | 349/148 |
| 6,678,033 B1 | 1/2004 | Brandt et al. | |
| 6,700,638 B1 | 3/2004 | Nousiainen | |
| 8,022,913 B2 | 9/2011 | Zhang et al. | |
| 2005/0105009 A1* | 5/2005 | Dunn ................ | G02F 1/133382 349/21 |
| 2006/0139501 A1 | 6/2006 | Lee et al. | |
| 2007/0012897 A1* | 1/2007 | Lee et al. ................... | 252/299.1 |
| 2007/0188428 A1* | 8/2007 | Nishiyama ........... | G09G 3/2011 345/87 |
| 2009/0251397 A1* | 10/2009 | Dunn ................ | G02F 1/133382 345/87 |

FOREIGN PATENT DOCUMENTS

| | | |
|---|---|---|
| TW | 200508699 | 3/2005 |
| TW | 200527041 | 8/2005 |
| WO | WO 2014/085101 | 6/2014 |

OTHER PUBLICATIONS

Notification Concerning Transmittal of International Preliminary Report on Patentability for Application No. PCT/US2007/008513, dated Oct. 16, 2008, 8 pages.

Search Report of TW102140457 dated Jun. 1, 2015 entitled "Instant-On Heater".

* cited by examiner

RESISTOR MESHES FOR DISPLAY HEATING

RELATED APPLICATION(S)

This application claims the benefit of U.S. Provisional Application No. 61/732,277, filed on Nov. 30, 2012. The entire teachings of the above application are incorporated herein by reference.

BACKGROUND OF THE INVENTION

A liquid crystal display (LCD) has limited operating temperature range due to the characteristics of liquid crystal (LC). As the temperature decreases, LC response time increases dramatically because of the increased viscosity. Consequently, a LCD cannot operate properly at low temperatures. Three approaches or heating systems for maintaining proper display operating temperature have been employed in existing LCD technologies. These heating systems include: (i) an external heater attached to the Indium Tin Oxide (ITO) glass surrounding an active pixel array, (ii) an internal row line heater, and (iii) an internal common electrode line (VCOM) heater. Each type of heating system has various shortcomings.

Typically, the external heater is attached to the Thin Film Transistor/Indium Tin Oxide (TFT/ITO) cover glass following display fabrication. Such an approach provides maintenance heating by conducting current through the LCD cover glass. Because the external heater provides heat along the edges of the LCD and through the cover glass(es), an external heater is generally inefficient and unable to rapidly warm the display during cold start conditions. The row line heater and the VCOM heater provide much higher efficiency and uniform heat close to the LC material and can be used during cold start conditions.

FIG. 1 shows a diagram of a standard pixel array 100 with polysilicon row lines 110 and polysilicon VCOM lines 130. The row lines 110 carry signals to control pixel transistors. $C_{LC}$ is the capacitance between the pixel electrode and the ITO common plate with the liquid crystal in between. VCOM serves as one plate of the pixel storage capacitors ($C_{stg}$) and is tied to a DC voltage during display operation. The DC voltage is effectively shielded from the LC by the active layer which resides between the VCOM lines and LC material. The active layer also serves as another plate of the storage capacitor.

The second approach is a row line heater which is an internal heater integrated into the active matrix architecture of the display. The row line heater can be used during cold start conditions to rapidly warm the LC material. The row line heater is located within the pixel array, very close to the LC, so that it can provide high efficiency, uniform heating inside of the LCD glass.

FIG. 2 shows a row line heating scheme. Row line drivers 230, 232 drive current through polysilicon row lines 210 from one end to the other and supply heat to the pixel array 200. Since the row lines 210 also control pixel 220 operation, a display cannot operate during row line heating. The warm-up time needed during a cold start limits their usage in various applications of this heating scheme.

FIG. 3 shows a VCOM heating scheme. The VCOM heater utilizes the polysilicon VCOM lines 344 of the pixel array 300 as resistive heating elements. Two terminals, V1 340 and V2 342, are tied to the proper DC voltages to control the current through the VCOM lines 344 and produce heat close to the LC. The DC voltage has no effect on the AC video voltages stored in storage capacitors (Cstg), and therefore there is no effect on the pixel voltage (of pixels 348). With the active layer to shield the LC from the heater voltage, it is possible to heat the display during normal operation without introducing visible image artifacts. The heater terminals V1 340 and V2 342 are preferably externally accessible to the display package so that the heater can be controlled separately from the operation of the display circuits.

SUMMARY OF THE INVENTION

The present invention addresses problems in the art and provides an improved Liquid Crystal Display heating system. An example embodiment includes a two dimensional array of display elements disposed on a common semiconductor substrate, each display element (or a pixel) comprising at least a pixel transistor, a storage capacitor (Cst), and a pixel electrode. Each transistor is arranged to control an operation state of the pixel, and has at least a gate, a drain, and a source terminal. The drain terminal is coupled to a first plate of the storage capacitor. A plurality of row select lines is distributed to control a first plurality of gate terminals. A plurality of column lines is distributed to pass video voltages to the pixel electrodes through respective pixel transistors. A resistor heating mesh includes a plurality of horizontal common voltage lines and a plurality of vertical common voltage lines. Each horizontal common voltage line is arranged in an orientation parallel to the row select lines and independent of both the row select and column lines. Each horizontal common voltage line also is coupled to and integral with two or more display elements at least at a second plate of the storage capacitor in each display element. Each horizontal common voltage line further includes two horizontal terminals providing a first horizontal node and a second horizontal node. Each vertical common voltage line is arranged in an orientation parallel to the column lines and independent of both the row select and column lines. Each vertical common voltage line is also coupled to the horizontal common voltage lines to form the mesh VCOM of the present invention. Each vertical common voltage line further includes two vertical terminals providing a first vertical line node and a second vertical line node.

And the example embodiment includes a heater driver connected to each heater terminal to supply a proper DC voltage so proper current flows through the polysilicon VCOM lines. This is accomplished by the heater driver being coupled to at least one first and second vertical line node and arranged to supply at least a first and second vertical common line voltage to the at least one first and second vertical line node, respectively. The first vertical common line voltage is supplied at the first vertical line node, and the second voltage is supplied at the second vertical line node. This produces a vertical common line voltage difference and a vertical common line current flow through the vertical common voltage line, and thereby heats the display elements couple thereto.

The heater driver can further control a source voltage applied to the heater terminal, independently of voltages applied to control the row select and column lines, enabling heat to be applied directly to the display element while the display element is actively operating to display information.

The heater driver can be further coupled to at least one first and second horizontal line node and arranged to supply at least a first and second horizontal common line voltage to the at least one first and second horizontal node, respectively. The first horizontal common line voltage is supplied at the first horizontal node, and the second horizontal common line voltage is supplied at the second horizontal node producing a horizontal voltage difference and a current flowing through the horizontal common voltage line, and thereby heating the display elements coupled thereto.

The heater driver can further include a voltage divider arranged to supply voltage continuity between the at least one first vertical line node and the first horizontal line node. The horizontal and vertical common voltage lines of the resistor heating mesh can be formed of polysilicon. The vertical common voltage lines can be metal-strapped vertical common voltage lines and the horizontal common voltage lines are formed of polysilicon. The horizontal common voltage lines can be metal-strapped horizontal common voltage lines and the vertical common voltage lines can be formed of polysilicon. The row select lines can be metal row lines.

The resistor heating mesh can reduce horizontal crosstalk and provide a resistance level from one point in the array of display elements to an edge of the array that is much less than a corresponding resistance level from one corresponding point in horizontal-only common heater (i.e., an internal common voltage line (VCOM) heater) line array of display elements to an edge of the horizontal-only common heater line array. The resistor heating mesh can be disposed adjacent to each of the transistor and pixel electrode in each display element. Each horizontal and vertical common voltage line can be located in a plane beneath an active layer of the pixel elements.

The display elements can be used in at least one of: a digital camera, digital Single Lens Reflex (SLR) camera, night vision display, handheld video game display, mobile telephone, or video eyewear device.

At least one of the row select line or column line can be controlled by a low power shift register. The low power shift register can includes a stage circuit, the stage circuit can include a single voltage node driven by a single transistor. The heating element is the polysilicon (resistive) VCOM line connected horizontally and vertically in a mesh style. The active layer serves as another plate of the storage capacitor. The active layer (pixel electrodes) shields the LC (Liquid Crystal) material from the DC voltage on the polysilicon VCOM.

According to a yet further example embodiment, a display apparatus includes a LCD display coupled to a horizontal and a vertical heating driver. The horizontal heating driver and the vertical heating driver coupled to one or more VCOM resistor heating meshes. The resistor heating meshes improve the display heating system capacity so that the display is heated faster from low temperatures.

Further, the resistor meshes provide a resistance level from one point in the pixel array to an edge that is much less than pixel-to-pixel horizontal VCOM resistance. This results in reduced horizontal crosstalk, an improvement over the art.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 4b is a schematic illustration of the column line stack in the pixel array of FIG. 4a.

DETAILED DESCRIPTION OF THE INVENTION

A description of example embodiments of the invention follows.

Image artifacts associated with high-resistance VCOM lines are indicative of horizontal crosstalk, which can be caused by charge coupling from the column lines. The amount of coupling charge is different on each row depending on the pattern displayed on the LCD and is perceived as the horizontal crosstalk. The higher the resistance of the VCOM lines, the longer the RC time constant and the more visible the horizontal crosstalk. This becomes a problem for high resolution displays as such displays have more coupling from many columns and faster operation, and, thus, a limited time for charge to disperse.

As described herein and in more detail below, example embodiments of the present invention provide improvements for heating an LCD display of a digital system or the like. In particular, example embodiments of the present invention improve the heating capacity of such LCDs so that the display can be heated faster from low temperatures. An example of a display heating system that may be improved by the present invention is described in U.S. Pat. No. 8,022,913 by Kun Zhang et al., issued Sep. 20, 2011, herein incorporated by reference in its entirety. It will be understood by those of skill in the art that other display heating systems may be similarly improved by the principles of the present invention.

Figure 4A:
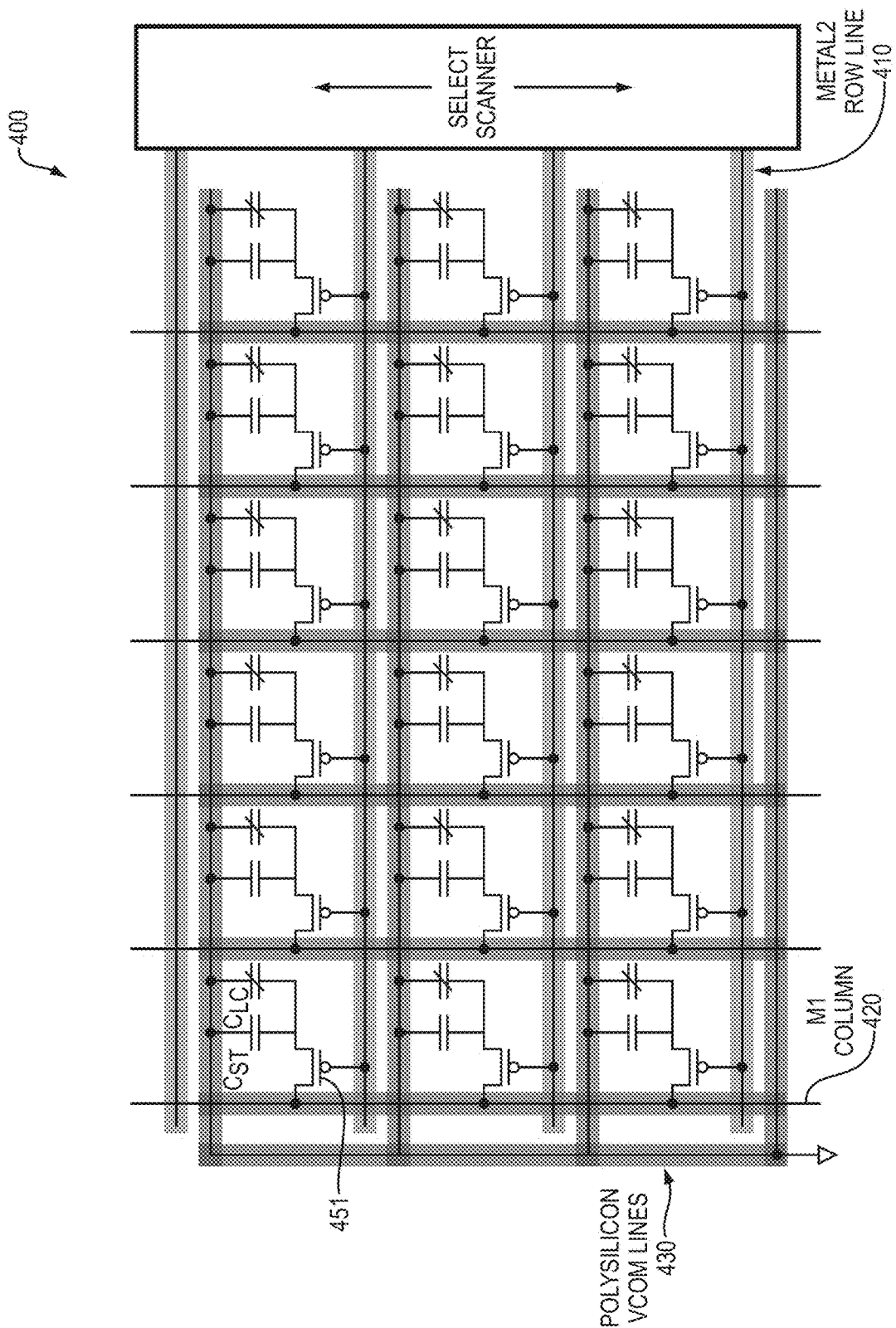
FIG. 4a is a schematic diagram of a metal row line and polysilicon VCOM pixel array of the present invention.
Figure 5:
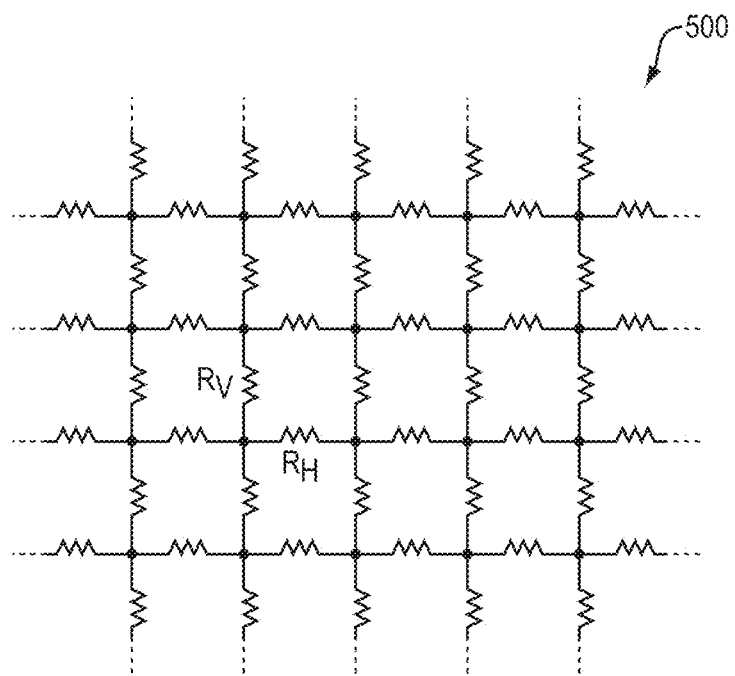
FIG. 5 is a schematic diagram of a polysilicon VCOM resistor grid of the present invention.

Traditionally, the row lines and the VCOM lines are both made of polysilicon and run horizontally, in parallel with each other, in the pixel array. Using a newly developed metal row line, polysilicon VCOM lines can be connected vertically in the pixel array, resulting in a resistor heating mesh. FIG. 4a shows such a polysilicon VCOM resistor heating mesh 430 and metal row lines 410 in a pixel array 400. FIG. 5 shows a circuit diagram of such a polysilicon VCOM resistor heating mesh formed of polysilicon VCOM resistor grids 500. When the edge points are tied together, the resistance from one point in the pixel array to an edge is much lower compared with the traditional pixel-to-pixel horizontal VCOM resistance. Consequently, the horizontal crosstalk is dramatically reduced.

Traditional row line heating is not practical using the metal row lines because of low metal resistance and risk of electromigration. However, other VCOM heating schemes can be achieved with resistor heating mesh (also referred to herein as mesh VCOM) of the present invention.

Figure 4B:
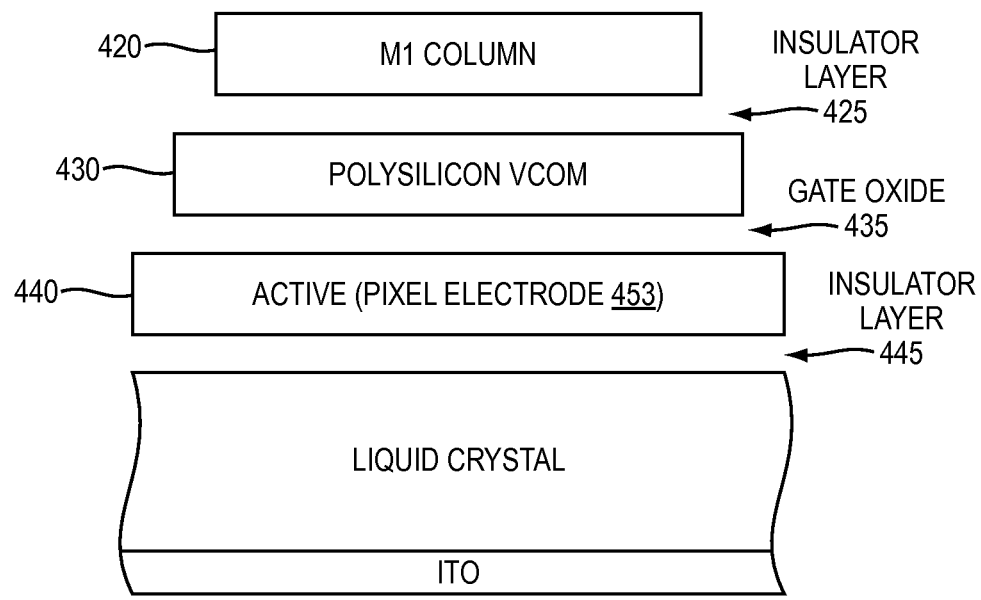

In FIG. 4a, a two dimensional array 400 of display elements is disposed on a common semiconductor substrate. Each display element (or pixel) comprises a pixel transistor 451, a storage capacitor ($C_{ST}$) and a pixel electrode 453 (FIG. 4b). Each pixel transistor 451 is arranged to control operation state of the pixel. A pixel transistor 451 is formed of a gate, a drain and a source terminal. The drain is coupled to a first plate of the storage capacitor ($C_{ST}$).

A plurality of metal row select lines 410 is distributed to control a first plurality of the transistor 451 gate terminals. A plurality of polysilicon column lines is distributed with the column lines connected to the source of the pixel transistors 451. The column lines carry video signals that are passed to the pixel electrodes 453 through respective pixel transistors 451.

Continuing with FIG. 4a, the resistor heating mesh 430 of the present invention includes a plurality of horizontal common voltage lines (polysilicon) and a plurality of vertical common voltage lines (polysilicon). Each horizontal common voltage line is arranged in an orientation that is parallel to the metal row select lines 410 and independent of both the row select lines 410 and the column lines. Each horizontal common voltage line is coupled to and integral with two or more display elements (pixels) at a second plate of the storage capacitor $C_{ST}$ in each display element. Each horizontal common voltage line further includes two horizontal terminals that provide a first horizontal node and a second horizontal node.

Each vertical common voltage line of mesh VCOM 430 is arranged in an orientation parallel to the column lines and independent of both the row select and column lines. Each vertical common voltage line is coupled to the horizontal common voltage lines to form the mesh structure/design. Each vertical common voltage line includes two vertical terminals providing a first vertical line node and a second vertical line node. These nodes may serve as heater terminals.

As will be made clear below, a heater driver may be connected to each heater (mesh VCOM 430) terminal to supply a proper DC voltage that causes a proper current to flow through the polysilicon VCOM lines 430. The current flow heats the display elements coupled to the vertical common voltage lines of mesh VCOM 430.

With reference to FIG. 4b, shown is a vertical pixel structure or column line stack. The metal column 420 is connected to the source of the pixel transistor 451. The vertical polysilicon VCOM lines of 430 are connected to the horizontal polysilicon VCOM lines 430 to form a mesh style VCOM. The vertical polysilicon VCOM lines 430 serve as one plate of storage capacitor $C_{ST}$ and can be used for heating. The active layer 440 (containing pixel electrodes 453) is the pixel transistor 451 drain and serves as the other plate of $C_{ST}$. The active layer 440 shields the LC (liquid crystal) material from the DC voltage on the polysilicon mesh VCOM 430 lines. An insulating layer 425 lies between metal column 420 and the polysilicon VCOM lines 430. A gate oxide layer 435 is disposed between the polysilicon VCOM lines 430 and the active layer 440. There is an insulator layer 445 between active layer 440 and the LC material.

Heating a c×r Pixel Array With Mesh VCOM
c=number of columns
r=number of rows
$R_H$=pixel-to-pixel horizontal resistance
$R_V$=pixel-to-pixel vertical resistance 1. Horizontal Heating: Heater Driver on Left/Right Edges $$R_{ARRAY,H} = \frac{R_{ROW}}{r}$$

$$\text{Horizontal Heater Power}(P_H) = \frac{V^2}{R_{ARRAY,H}} = \frac{V^2}{(R_{ROW}/r)} = r \cdot \left(\frac{V^2}{R_{ROW}}\right)$$

A vertical VCOM connection does not affect horizontal heating. As shown in the horizontal heater driver 600 of FIG. 6, uniform current $I_H$ flows through the horizontal resistors $R_H$. Heater power is dependent of the resistivity of the VCOM lines. In small pixel displays, the horizontal VCOM lines are typically narrow to maximize the display aperture, and, thus, a more resistive VCOM that produces lower heater power.

2. Vertical Heating: Heater Driver on Top/Bottom Edges $$R_{ARRAY,V} = \frac{R_{COL}}{c}$$

$$\text{Vertical Heater Power}(P_V) = \frac{V^2}{(R_{COL}/c)} = c \cdot \left(\frac{V^2}{R_{COL}}\right)$$

Figure 6:
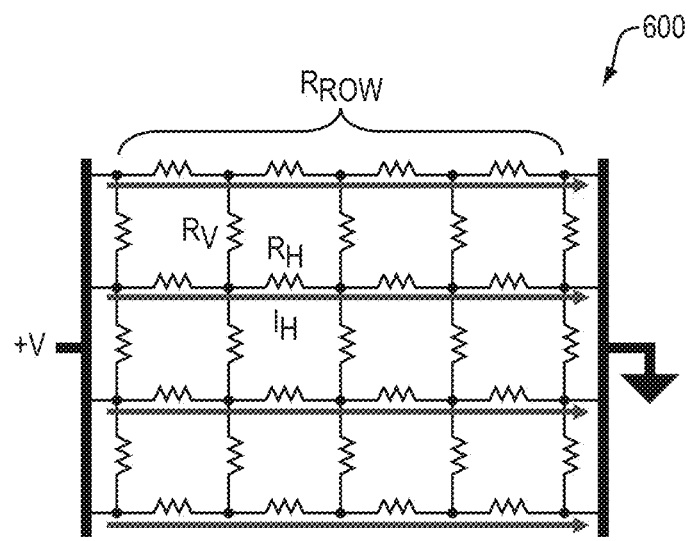
FIG. 6 is a schematic diagram of a horizontal heating with mesh VCOM according to the present invention.
Figure 7:
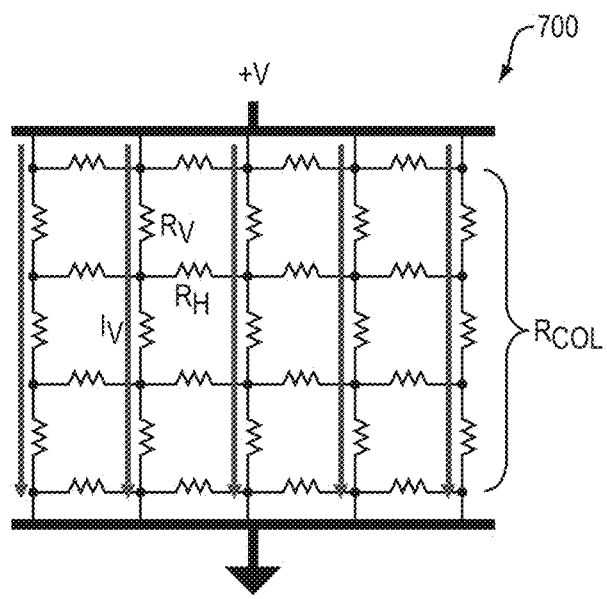
FIG. 7 is a schematic diagram of vertical heating with mesh VCOM according to the present invention.

As shown in FIG. 7, a vertical heater driver 700 provides a uniform current $I_V$ through the vertical resistors $R_V$ in a manner that is similar to that of the horizontal heater 600 of FIG. 6. Nevertheless, the vertical heater 700 has more advantages in color displays and wide aspect ratio displays.

In a square monochrome display, $R_{ROW}=c \cdot R_H$; $R_{COL}=r \cdot R_V$; and c/r=1

$$P_{H,MONO} = r \cdot \left(\frac{V^2}{R_{ROW}}\right) = \frac{r}{c} \cdot \left(\frac{V^2}{R_H}\right) = \frac{V^2}{R_H}$$

$$P_{V,MONO} = c \cdot \left(\frac{V^2}{R_{COL}}\right) = \frac{c}{r} \cdot \left(\frac{V^2}{R_V}\right) = \frac{V^2}{R_V}$$

In a square color display of same resolution;

$$R_{ROW} = c \cdot \frac{R_H}{3}; R_{COL} = r \cdot R_V;$$

and c/r=3

$$P_{H,COLOR} = r \cdot \left(\frac{V^2}{R_{ROW}}\right) = r \cdot \frac{V^2}{\left(c \cdot \frac{R_H}{3}\right)} = 3 \cdot \frac{r}{c} \cdot \left(\frac{V^2}{R_V}\right) = \frac{V^2}{R_V} = P_{H,MONO}$$

$$P_{V,COLOR} = c \cdot \left(\frac{V^2}{R_{COL}}\right) = \frac{c}{r} \cdot \left(\frac{V^2}{R_V}\right) = 3 \cdot \frac{V^2}{R_V} = 3 \cdot P_{V,MONO}$$

In a wide-screen monochrome display of aspect ratio 16:9, c/r=16/9

$$P_{H,MONO,WIDE} = \frac{r}{c} \cdot \left(\frac{V^2}{R_H}\right) = \frac{9}{16} \cdot \left(\frac{V^2}{R_H}\right) = 0.56 \cdot P_{H,MONO}$$

$$P_{V,MONO,WIDE} = \frac{c}{r} \cdot \left(\frac{V^2}{R_V}\right) = \frac{16}{9} \cdot \left(\frac{V^2}{R_V}\right) = 1.8 \cdot P_{V,MONO}$$

In a wide-screen color display of aspect ratio 16:9; c/r=3×16/9

$$P_{H,COLOR,WIDE} = 3 \cdot \frac{r}{c} \cdot \left(\frac{V^2}{R_H}\right) = 3 \cdot \frac{9}{3 \times 16} \cdot \left(\frac{V^2}{R_H}\right) = 0.56 \cdot P_{H,MONO}$$

$$P_{V,COLOR,WIDE} = \frac{c}{r} \cdot \left(\frac{V^2}{R_V}\right) = 3 \times \frac{16}{9} \left(\frac{V^2}{R_V}\right) = 5.33 \cdot P_{V,MONO}$$

Assuming $R_H = R_V$, a vertical heater, such as vertical heater 700, in a color display can provide three times more heat than that of a monochrome display of the same resolution. A vertical heater in a wide-screen display can provide $(16/9)^2 \cong 3.16$ times more heat than that of a horizontal heater. The vertical heater 700 provides the most advantage in a wide-screen color display where the vertical heater power is 9.5 times more than the horizontal heater 600 power.

3. Four-Sided Heating

Figure 8:
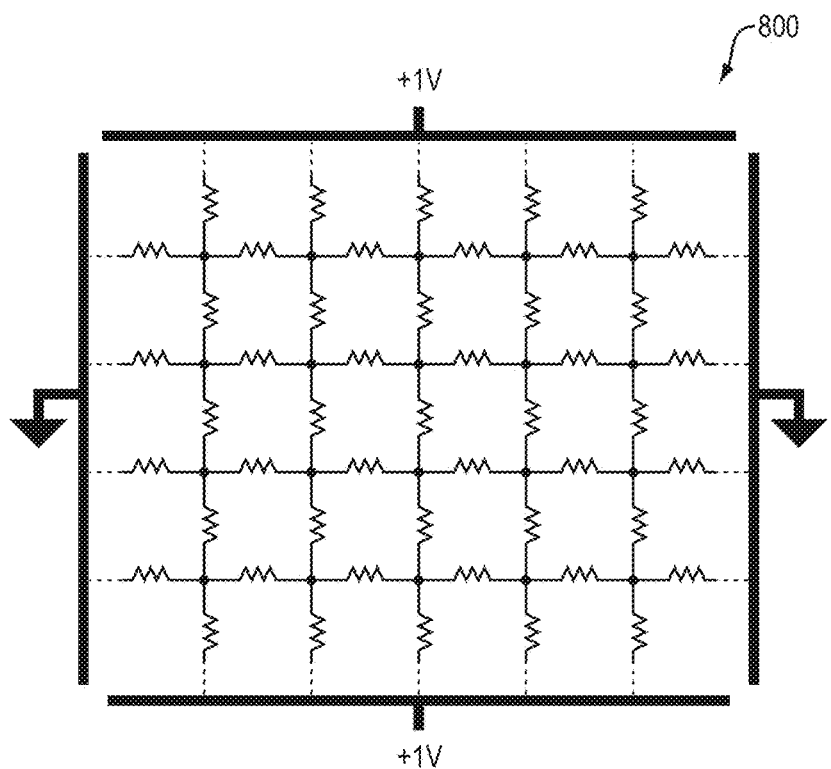
FIG. 8 is a schematic diagram of a four-sided heating with top and bottom edges at +1V and grounded side edges.
Figure 9:
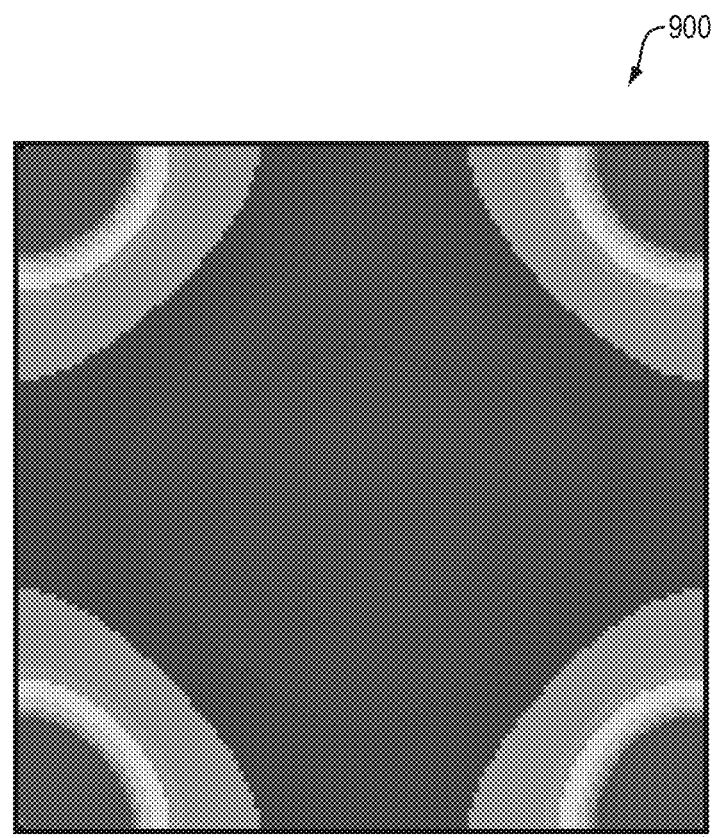
FIG. 9 is a heater power map associated with heater configuration in FIG. 8.
Figure 10:
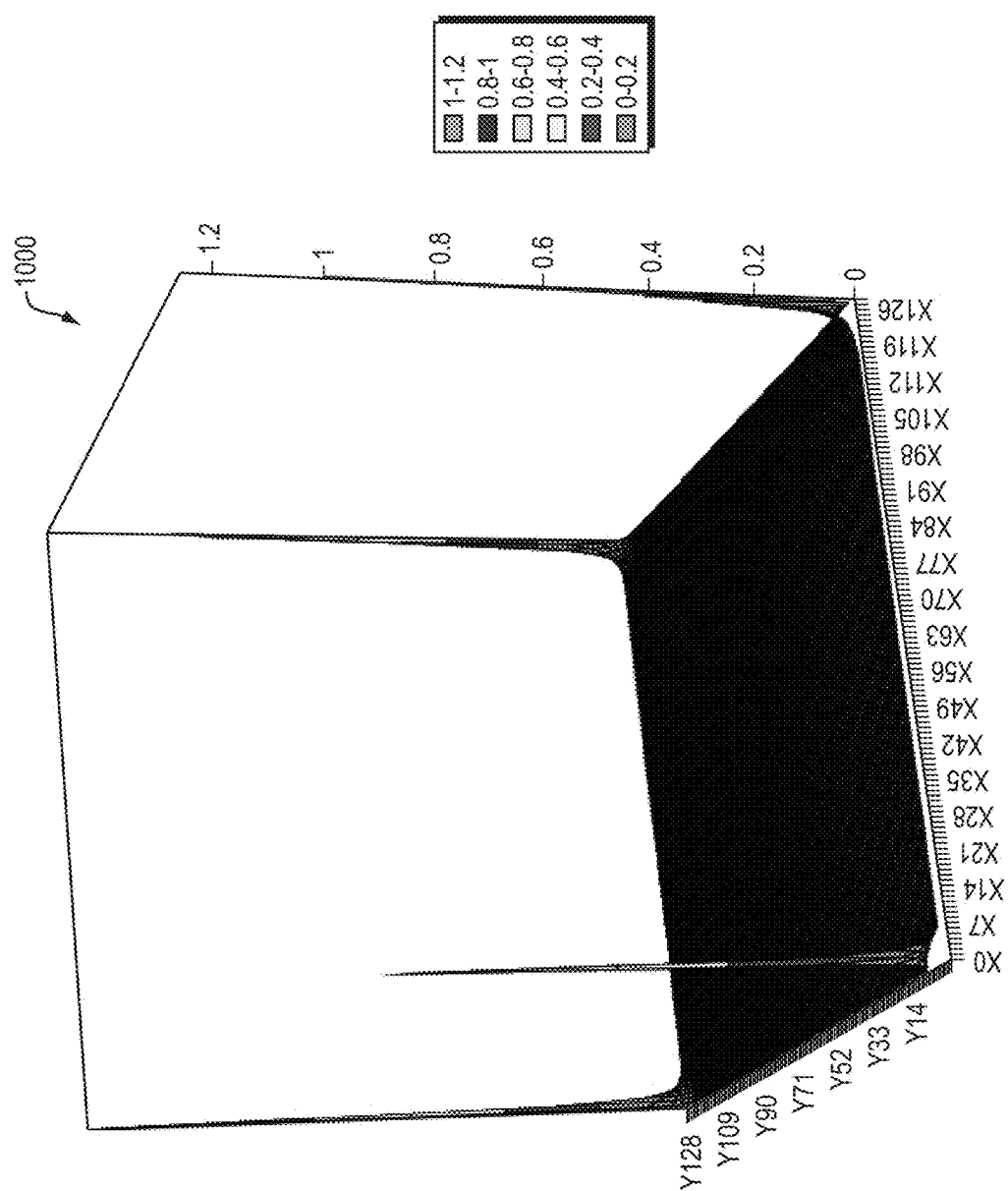
FIG. 10 is a 3-D heater power map associated with heater configuration in FIG. 8.

As illustrated in FIG. 8, Heater drivers 800 can be placed on all four sides allowing more heat around the pixel array. Heater power is non-uniform and depends upon how the voltage drivers are arranged about and coupled to the subject pixel array. For example, a 128×128 mesh of 1Ω resistors was simulated with different four-sided heating schemes, and the power maps of the pixel array were produced. In one such example, the heating drivers 800 supplied the top and bottom edges with +1V, and the side edges are grounded as shown in FIG. 8. Such a configuration causes non-uniform heating with very high currents in the corners of the VCOM mesh, as illustrated in temperature maps 900 and 1000 of FIGS. 9 and 10, respectivley. Such high heat would cause local LC clearing.

Figure 11:
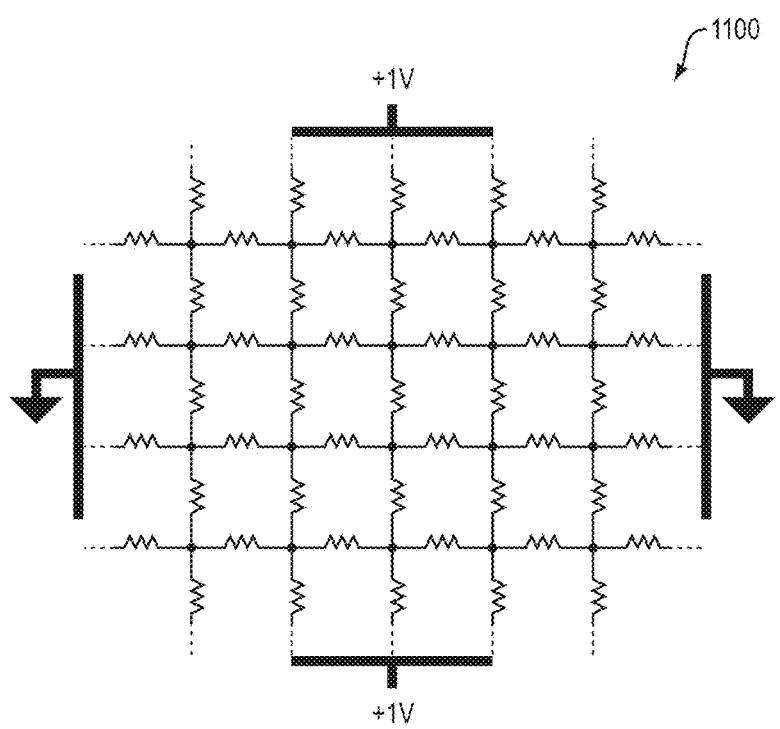
FIG. 11 is a schematic diagram of four-sided heating with partially driven edges.
Figure 12:
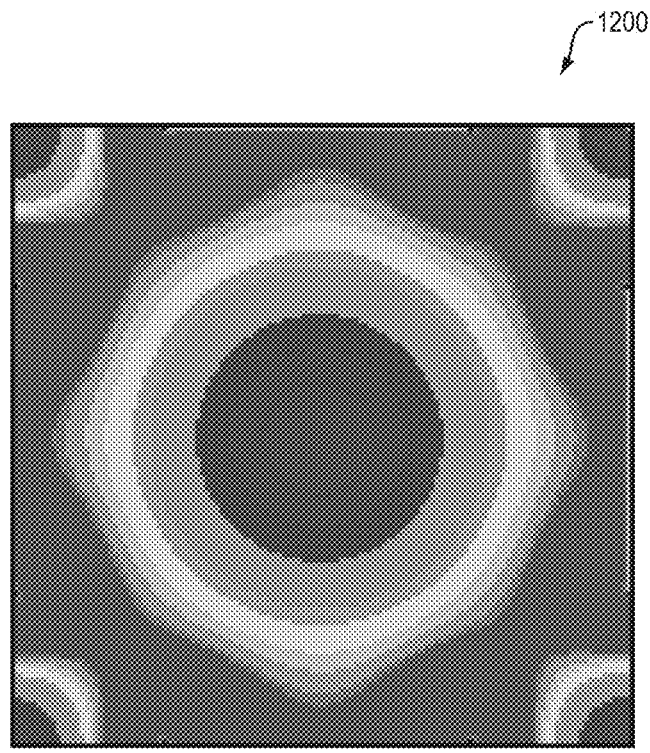
FIG. 12 is a heater power map associated with heater configuration in FIG. 11.
Figure 13:
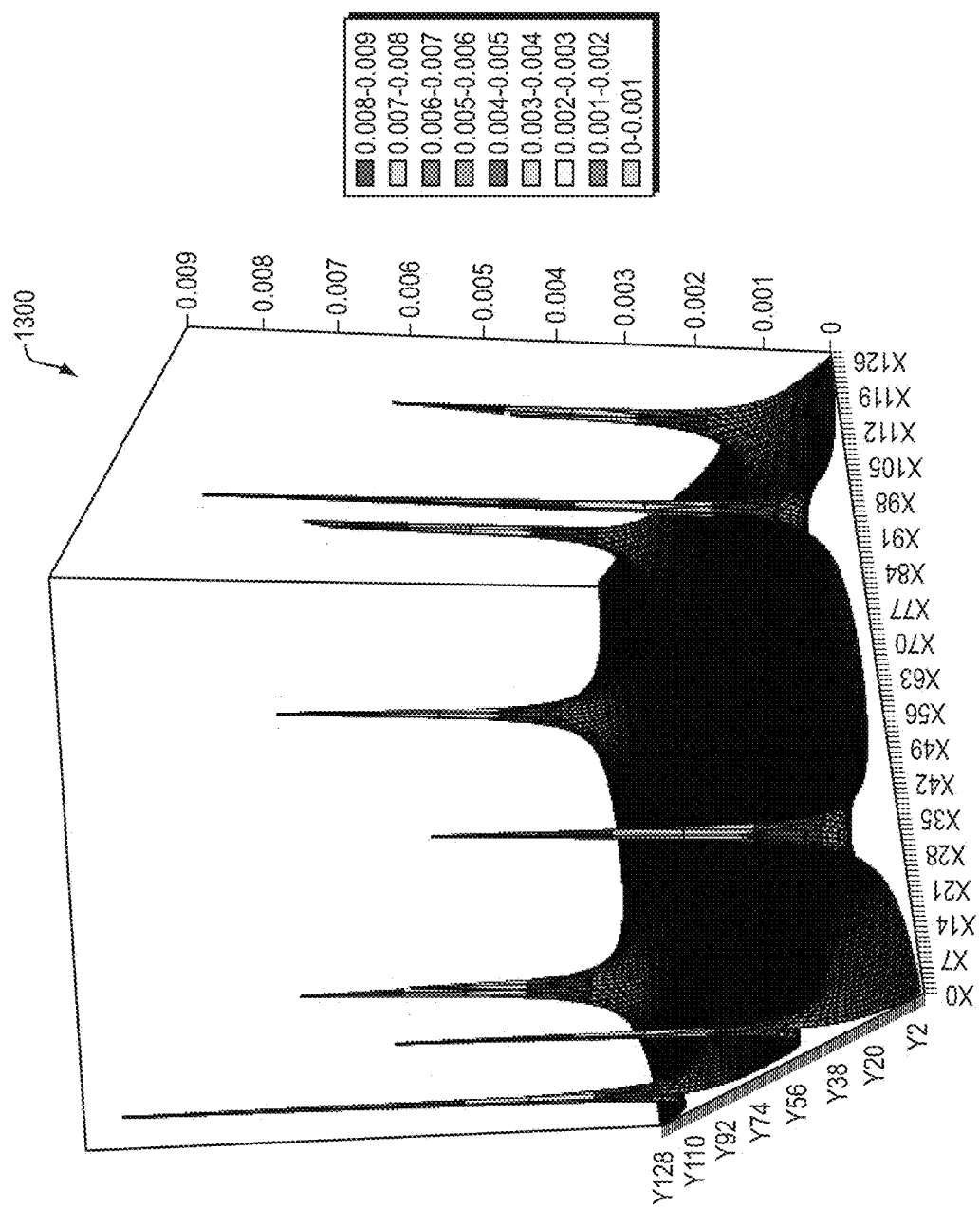
FIG. 13 is a 3-D heater power map associated with heater configuration in FIG. 11.

As an alternative, heater drivers 1100 can be connected partially to the edges as shown in FIG. 11. Heater power 1200, 1300 is more evenly distributed around the pixel array but there are still very high power spikes at the edges where the heater driver 1100 is disconnected from the mesh, as shown in FIGS. 12 and 13, respectively.

Figure 14:
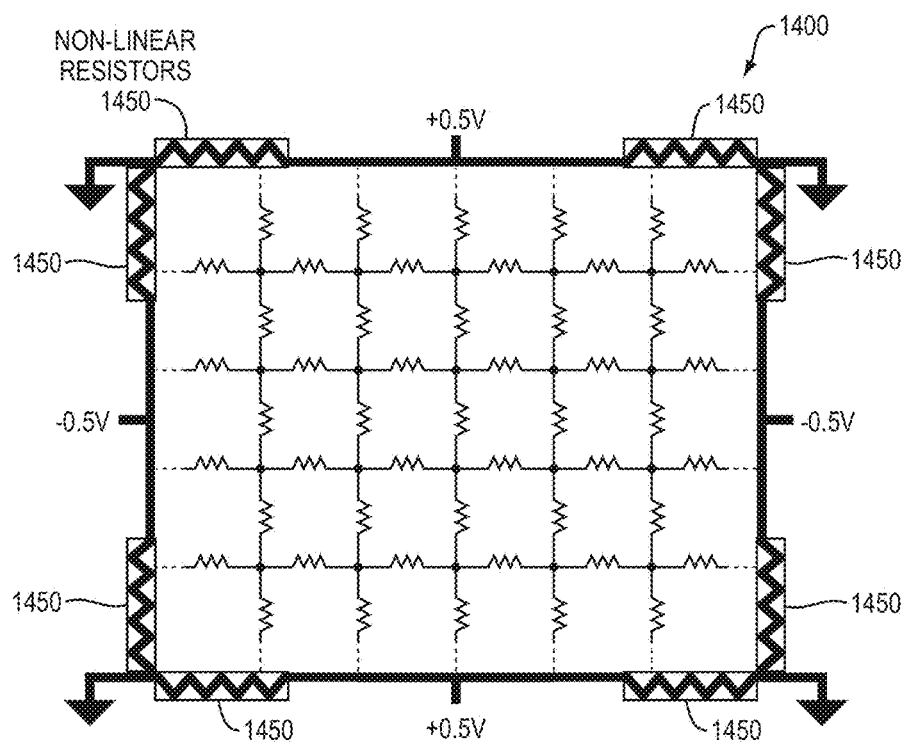
FIG. 14 is a schematic diagram of four-sided heating with voltage drop from center.
Figure 15:
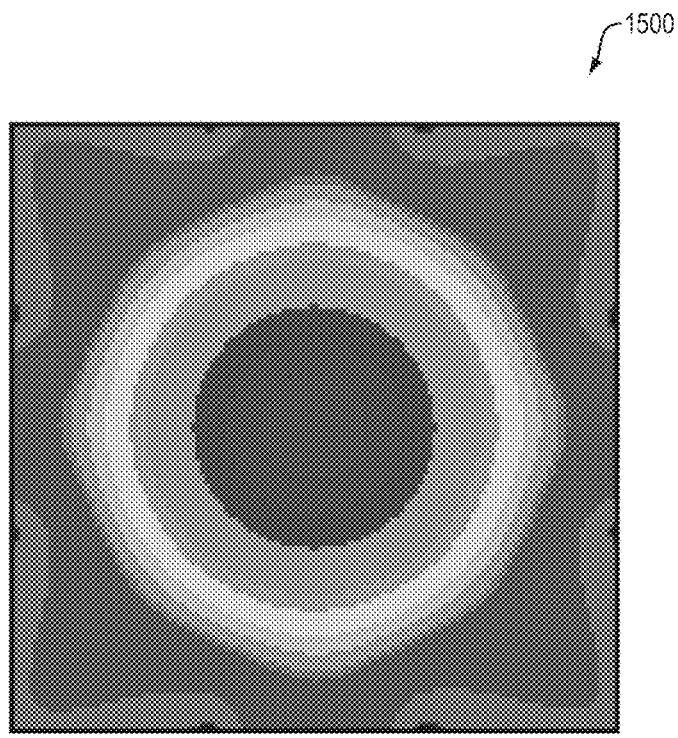
FIG. 15 is a heater power map associated with heater configuration in FIG. 14.
Figure 16:
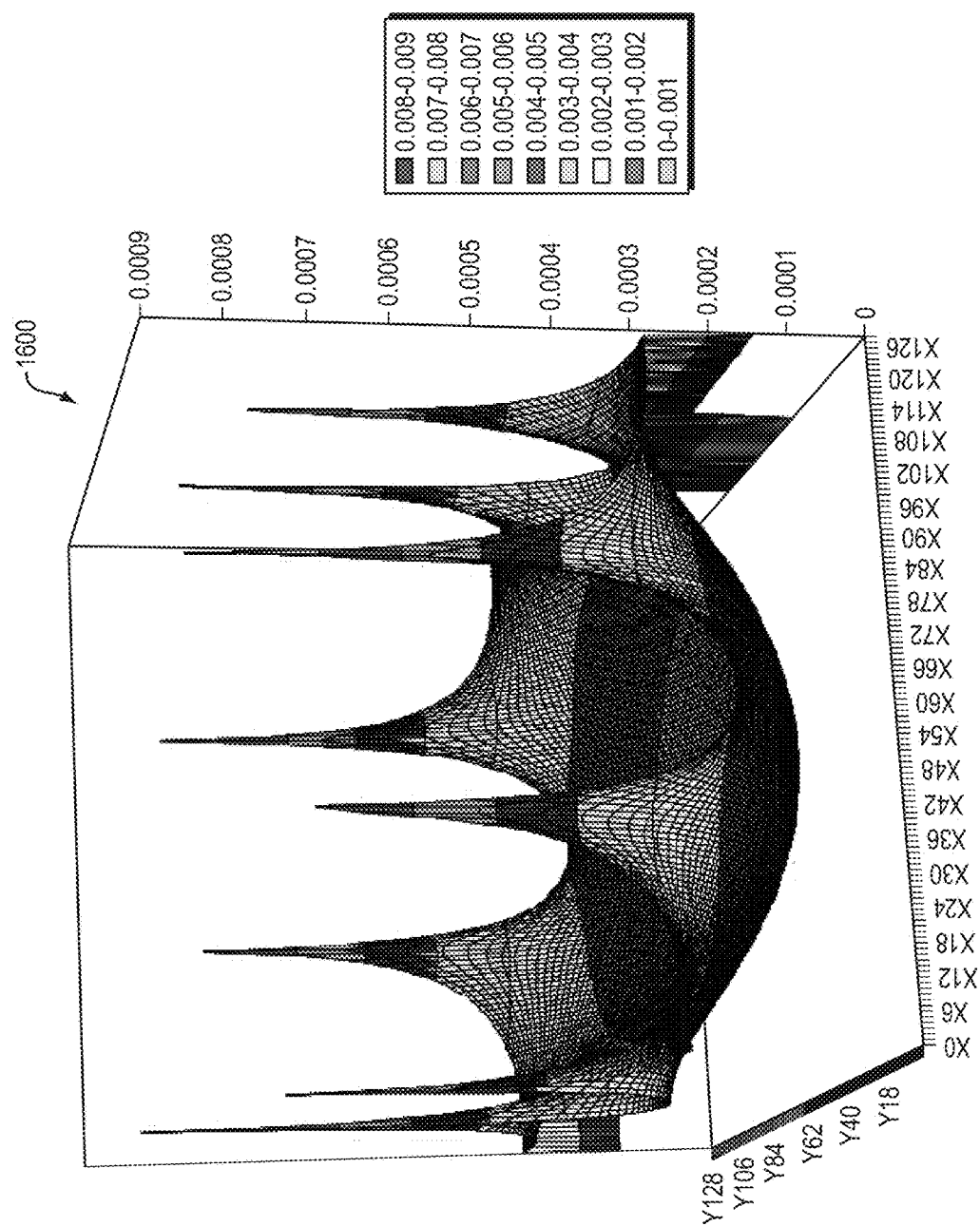
FIG. 16 is a 3-D heater power map associated with heater configuration in FIG. 14.

To avoid such big power spikes, voltage dividers 1450 can be used for voltage continuity between the four edges of the pixel array as shown in FIG. 14. In one embodiment, the voltage dividers 1450 are non-linear resistors. Simulations show more evenly distributed heat maps 1500, 1600 than the heat maps 1200, 1300 of the pixel arrays using discontinuous driven edges (e.g., heater driver 1100), as shown in FIGS. 15 and 16. Although the improved performance is useful, such a configuration (1400) is not practical because the resistor divider 1450 is part of the resistor heating mesh. A non linear voltage divider 1450 is needed to prevent big spikes at the edges of the heater driver plates. This adds a lot of design complexity and reduces the application flexibility.

Figure 17:
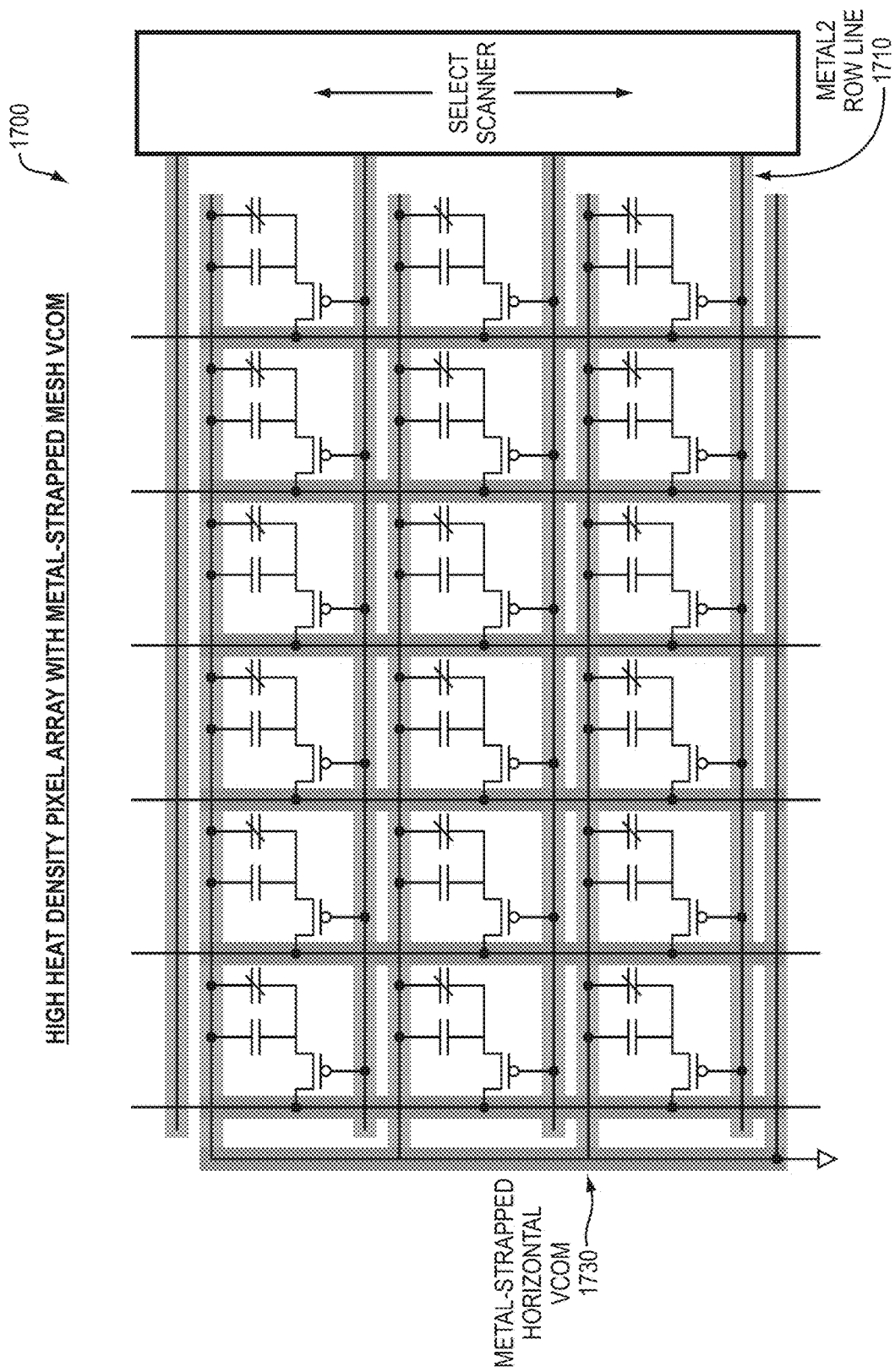
FIG. 17 is a schematic diagram of a metal row line and metal H-VCOM pixel array.
Figure 18:
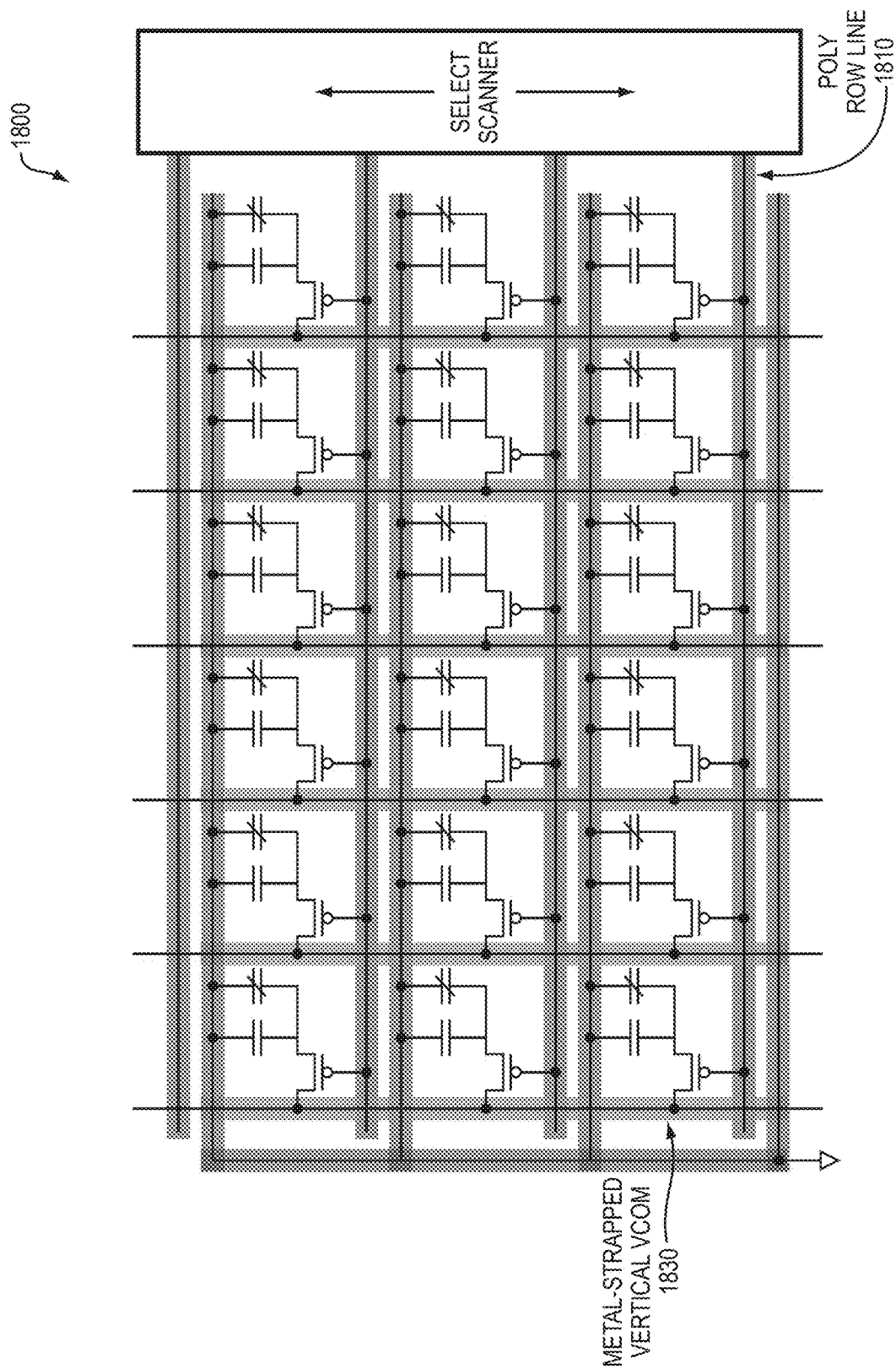
FIG. 18 is a schematic diagram of a poly row line and metal V-VCOM pixel array.

The VCOM mesh may be all polysilicon, such as VCOM mesh 430 shown in FIG. 4, or may be polysilicon in one dimension (i.e., the horizontal or vertical dimension) and metal in the other dimension. For example, FIG. 17 shows a diagram of a pixel array 1700 with metal row lines 1710 and horizontally metal-strapped mesh VCOM 1730. In another example, FIG. 18 shows a diagram of a pixel array 1800 with polysilicon row lines 1810 and vertically metal-strapped mesh VCOM 1830.

Figure 1:
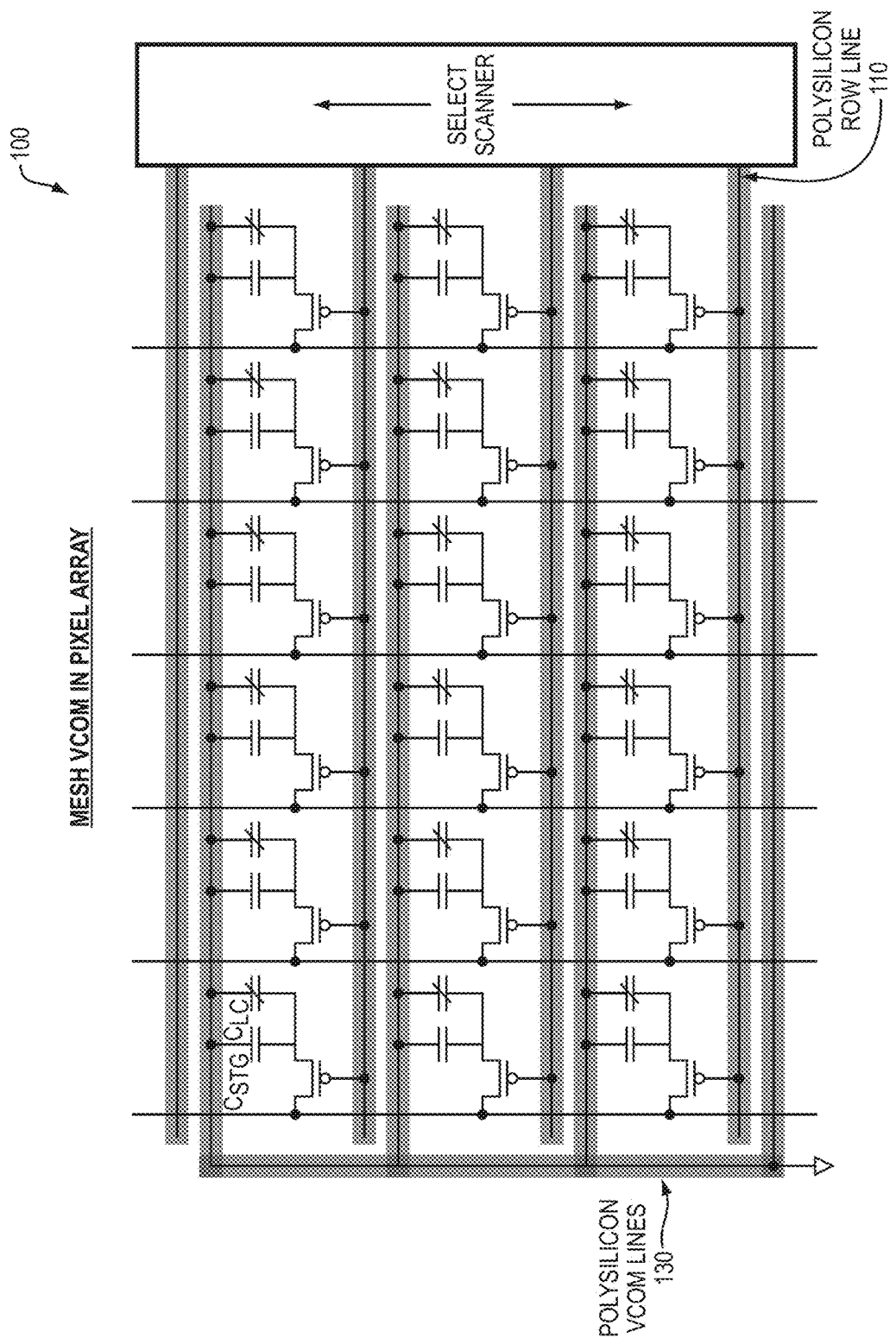
FIG. 1 is a schematic diagram of a polysilicon row line and polysilicon VCOM pixel array.
Figure 2:
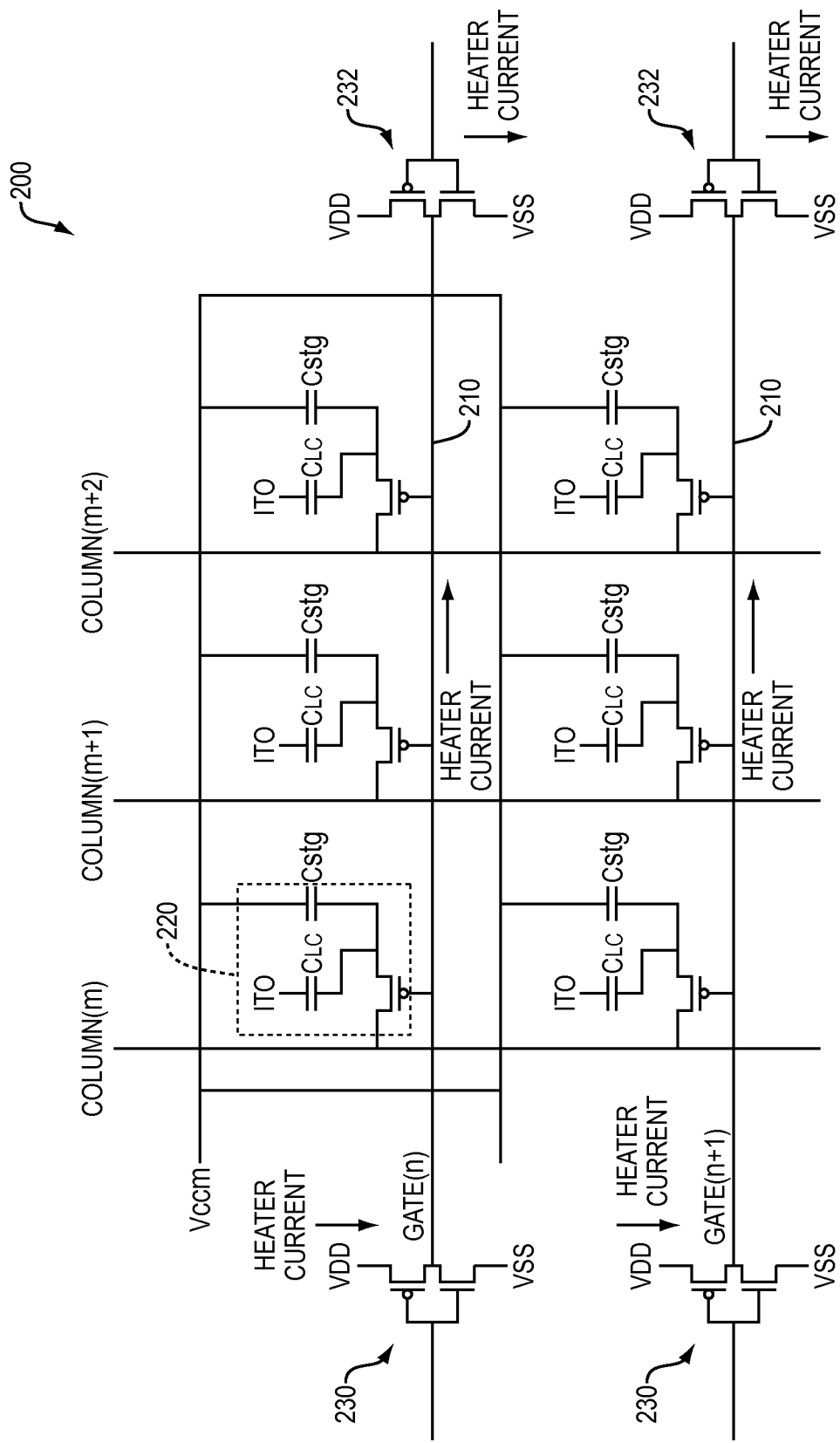
FIG. 2 is a schematic diagram of row line heating of the prior art.
Figure 3:
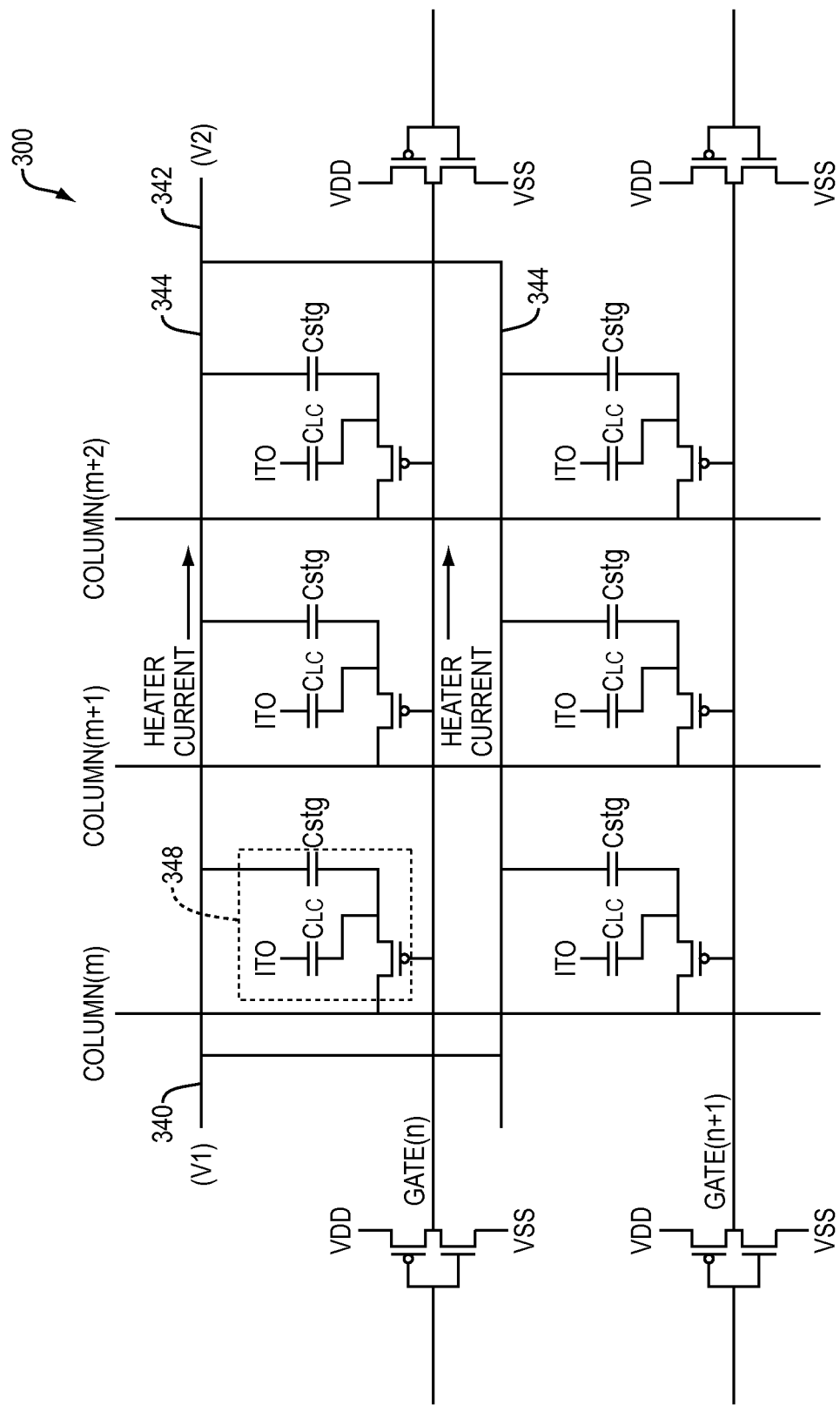
FIG. 3 is a schematic diagram of horizontal VCOM heating of the prior art.

In the case of a metal-strapped VCOM, a high density heat array can be achieved by applying DC voltages to the metal VCOM lines. Such an approach can yield much more heat density than a traditional horizontal VCOM heater (FIG. 3).

Figure 19:
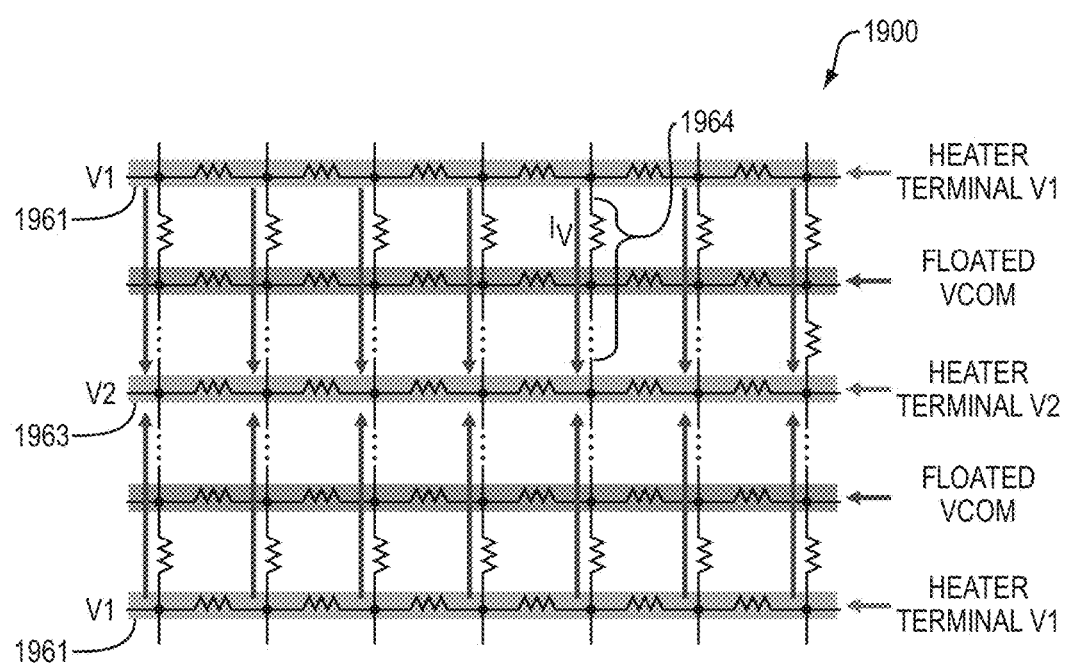
FIG. 19 is a schematic diagram of a heating with metal-strapped mesh VCOM.

High density vertical heating with DC voltages V1 and V2 is shown in FIG. 19. Uniform current $I_V$ flows through segments 1964 of vertical polysilicon VCOM resistor heating mesh 1900 from a vertical common voltage line 1961 with a higher voltage potential V1 to a vertical common voltage line 1963 with a lower voltage potential V2. A number of horizontal VCOM lines can be left unconnected to the VCOM resistor heating mesh 1900, but strapped with metal for uniform appearance of the pixel array. The resistance between the two heater lines 1961 and 1963 decreases linearly with the square product of pixel segments 1964 since the resistors are connected in parallel. The heater power increases as many times as the resistance decreases. Depending on the pixel size and design, the heat density and the heater power can be optimized by changing the number of these segments 1964.

For example, assume n=number of segments in the pixel array, $R_{eq}$=equivalent resistance, and V1−V2=V, For a pixel array with only top and bottom heater drivers, $$n = 1; R_{eq} = R; \text{Heater Power} = \frac{V^2}{R_{eq}} = \frac{V^2}{R}$$

For two-segmented array (as shown in FIG. 19), $$n = 2; R_{eq} = \frac{R}{2} // \frac{R}{2} = \frac{R}{4}; \text{Heater Power} = 4\frac{V^2}{R}$$

For n-segmented array, $$R_{eq} = \frac{R}{n^2}; \text{Heater Power} = n^2 \frac{V^2}{R}$$

Such an approach yields much higher heat density, particularly when combined with vertical common voltage line heating in a wide-aspect ratio LC display. For example, a four-segmented metal VCOM wide pixel array yields roughly 28 times more heat than a polysilicon VCOM square array. The horizontal metal VCOM will also further reduce the horizontal crosstalk because of the low-resistivity of the metal.

While this invention has been particularly shown and described with references to example embodiments thereof, it will be understood by those skilled in the art that various changes in form and details may be made therein without departing from the scope of the invention encompassed by the appended claims.

What is claimed is:

1. A display apparatus comprising:
   a two dimensional array of display elements disposed on a common semiconductor substrate, each display element comprising at least a pixel transistor, a storage capacitor (Cst) and a liquid crystal layer interposed between a pixel electrode and an ITO common plate;
   each transistor being arranged to control an operation state of the pixel, and having at least a gate, a drain, and a source terminal, the drain being coupled to a first plate of the storage capacitor;
   a plurality of row select lines distributed to control a first plurality of gate terminals;
   a plurality of column lines distributed to pass video voltages to the pixel electrode through the pixel transistor;
   a resistor heating mesh including three or more horizontal common voltage lines and three or more vertical common voltage lines;
     each horizontal common voltage line (i) being arranged in an orientation parallel to the row select lines and independent of the ITO common plate, as well as both the row select and column lines, (ii) being coupled to and integral with two or more display elements and (iii) at least serving as a second plate of the storage capacitor in each display element, each horizontal common voltage line further including two horizontal terminals providing a first horizontal node and a second horizontal node; and
     each vertical common voltage line being arranged in an orientation parallel to the column lines and independent of the ITO common plate, as well as both the row select and column lines, and being coupled to the three or more horizontal common voltage lines to form a mesh, each vertical common voltage line further including two vertical terminals providing a first vertical line node and a second vertical line node; and
   a heater driver coupled to at least one first and second vertical line node and arranged to supply at least a first and second vertical common line voltage to the at least one first and second vertical line node, respectively, the first vertical common line voltage supplied at the first vertical node and the second vertical common line voltage supplied at the second vertical node producing a vertical common line voltage difference and a vertical common line current flowing through the vertical common voltage line, and thereby heating the display elements coupled thereto.

2. The display apparatus of claim 1, wherein the heater driver further controls a source voltage applied to a terminal of the resistor heating mesh, independently of voltages applied to control the row select and column lines, enabling heat to be applied directly to the display element while the display element is actively operating to display information.

3. The display apparatus of claim 1, wherein the heater driver is further coupled to at least one first and second horizontal line node and arranged to supply at least a first and second horizontal common line voltage to the at least one first and second horizontal node, respectively, the first horizontal common line voltage supplied at the first horizontal node and the second horizontal common line voltage supplied at the second horizontal node producing a horizontal voltage difference and a current flowing through the horizontal common voltage line, and thereby heating the display elements couple thereto.

4. The display apparatus of claim 1, wherein the heater driver further includes a voltage divider arranged to supply voltage continuity between the at least one first vertical line node and the first horizontal line node.

5. The display apparatus of claim 1, wherein the horizontal and vertical common voltage lines of the resistor heating mesh are formed of polysilicon.

6. The display apparatus of claim 1, wherein the vertical common voltage lines are metal-strapped vertical common voltage lines and the horizontal common voltage lines are formed of polysilicon.

7. The display apparatus of claim 1, wherein the horizontal common voltage lines are metal-strapped horizontal common voltage lines and the vertical common voltage lines are formed of polysilicon.

8. The display apparatus of claim 1, wherein the row select lines are metal row lines.

9. The display apparatus of claim 1, wherein the resistor heating mesh includes a conductive intersection between a horizontal common voltage line and a vertical common voltage line corresponding to each pixel, thereby reducing horizontal crosstalk and providing a resistance level from one point in the array of display elements to an edge of the array that is much less than a corresponding resistance level from one corresponding point in horizontal-only common heater line array of display elements to an edge of the horizontal-only common heater line array.

10. The display apparatus of claim 1, wherein the resistor heating mesh is disposed adjacent to each of the transistor and pixel electrode in each display element.

11. The display apparatus of claim 1, wherein each horizontal and vertical common voltage line is located in a plane beneath an active layer of the pixel elements.

12. The display apparatus of claim 1, wherein the display elements are used in at least one of: a digital camera, digital Single Lens Reflex (SLR) camera, night vision display, handheld video game display, mobile telephone, or video eyewear device.

13. The display apparatus of claim 1, wherein at least one of the row select line or column line is controlled by a low power shift register.

14. The display apparatus of claim 13, wherein the low power shift register includes a stage circuit, the stage circuit including a single voltage node driven by a single transistor.

15. The display apparatus of claim 1, further including an active pixel electrode layer disposed between the resistor heating mesh and liquid crystal material layer.

16. A method of heating a display comprising:
   disposing a two dimensional array of display elements on a common semiconductor substrate, each display element comprising at least a pixel transistor, a storage capacitor ($C_{ST}$) and a liquid crystal layer interposed between a pixel electrode and an ITO common plate,
   each transistor being arranged to control an operation state of the pixel, and having at least a gate, a drain, and a source terminal, the drain being coupled to a first plate of the storage capacitor;
   having a plurality of row select lines distributed to control a first plurality of gate terminals;
   having a plurality of column lines distributed to pass video voltages to the pixel electrode through the pixel transistor;

providing a resistor heating mesh including three or more horizontal common voltage lines and three or more vertical common voltage lines;
- each horizontal common voltage line (i) being arranged in an orientation parallel to the row select lines and independent of the ITO common plate, as well as both the row select and column lines, (ii) being coupled to and integral with two or more display elements and (iii) at least serving as a second plate of the storage capacitor in each display element, each horizontal common voltage line further including two horizontal terminals providing a first horizontal node and a second horizontal node; and
- each vertical common voltage line being arranged in an orientation parallel to the column lines and independent of the ITO common plate, as well as both the row select and column lines, and being coupled to the three or more horizontal common voltage lines to form a mesh, each vertical common voltage line further including two vertical terminals providing a first vertical line node and a second vertical line node; and coupling a heater driver to at least one first and second vertical line node and arranged to supply at least a first and second vertical common line voltage to the at least one first and second vertical line node, respectively, the first vertical common line voltage supplied at the first vertical node and the second vertical common line voltage supplied at the second vertical node producing a vertical common line voltage difference and a vertical common line current flowing through the vertical common voltage line, and thereby heating the display elements coupled thereto.

* * * * *